No. 645,532. Patented Mar. 13, 1900.
G. H. MOTT.
WATERING TROUGH.
(Application filed Feb. 21, 1899.)
(No Model.)

Witnesses
J. Frank Culverwell.

George H. Mott, Inventor.
By his Attorneys,
C. A. Snow & Co.

THE NORRIS PETERS CO., PHOTO-LITHO., WASHINGTON, D. C.

UNITED STATES PATENT OFFICE.

GEORGE H. MOTT, OF WEST UNION, IOWA.

WATERING-TROUGH.

SPECIFICATION forming part of Letters Patent No. 645,532, dated March 13, 1900.

Application filed February 21, 1899. Serial No. 706,353. (No model.)

*To all whom it may concern:*

Be it known that I, GEORGE H. MOTT, a citizen of the United States, residing at West Union, in the county of Fayette and State of Iowa, have invented a new and useful Watering-Trough, of which the following is a specification.

The invention relates to improvements in watering-troughs.

One object of the present invention is to improve the construction of watering-troughs and to provide a simple, inexpensive, and efficient device capable of automatically controlling the flow of water into the drinking-receptacle and of shutting off the flow of the same when the water rises to the desired height and of starting the flow of the water when the contents of the drinking-receptacle are consumed to a sufficient extent.

A further object of the invention is to arrange the valve mechanism so that access to the same may be readily had for repair or other purposes.

The invention consists in the construction and novel combination and arrangement of parts hereinafter fully described, illustrated in the accompanying drawings, and pointed out in the claim hereto appended.

Figure 1:
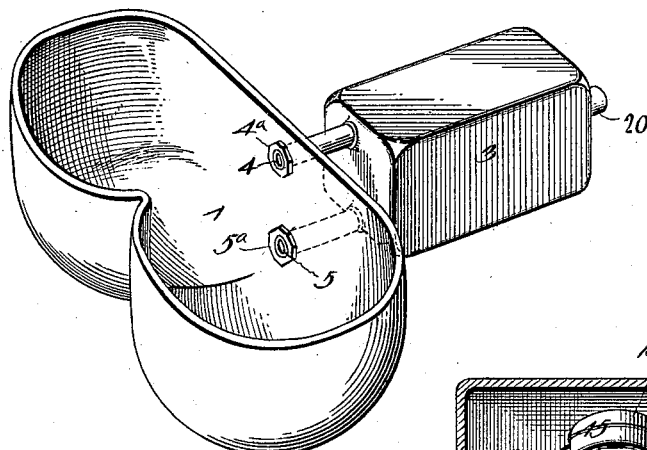
Figure 4:
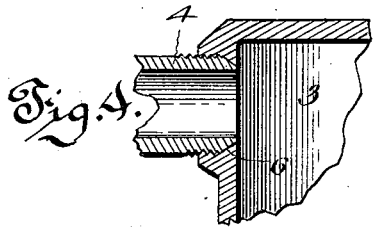
Figure 3:
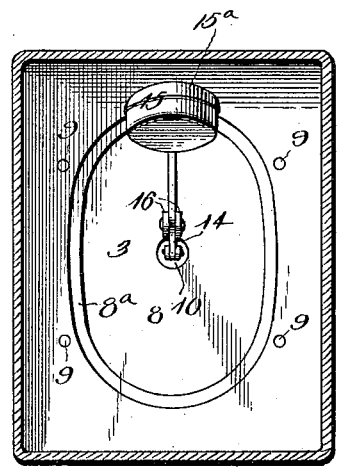
Figure 2:
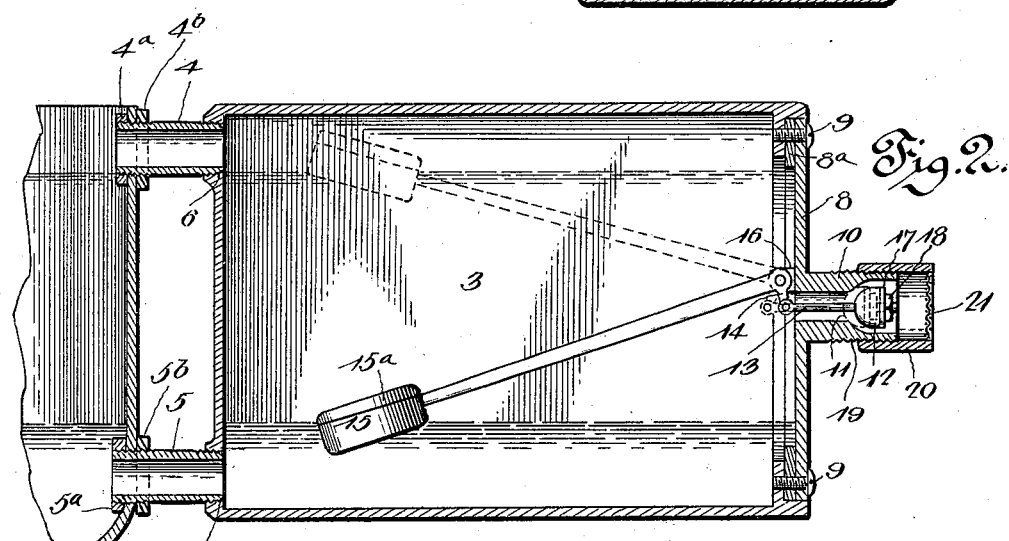

In the drawings, Figure 1 is a perspective view of a watering-trough constructed in accordance with this invention. Fig. 2 is a vertical longitudinal sectional view. Fig. 3 is a transverse sectional view. Fig. 4 is a detail sectional view illustrating the construction of the joint for connecting the short pipes with the chamber or casing.

Like numerals of reference designate corresponding parts in all the figures of the drawings.

1 designates a drinking-receptacle composed of two portions or lobes to form a double drinking-trough, and it is connected with a chamber or casing 3 by short upper and lower pipes 4 and 5, the lower one forming a passage for water and the upper one serving as a vent and permitting any overflow from the casing to be discharged into the drinking-receptacle. The upper and lower short tubes or pipes have threaded terminals, and their front ends are provided with nuts $4^a$ and $5^a$, their rear ends being screwed into suitable threaded openings of the chamber or casing 3, and washers $4^b$ and $5^b$ are arranged on the exterior of the drinking-receptacle at points opposite the nuts $4^a$ and $5^a$. The threaded openings of the chamber or casing 3 are reduced at their inner ends to form shoulders 6 and 7, and the adjacent ends of the pipes or tubes 4 and 5 are beveled to fit the shoulders, whereby a tight joint is effected to prevent any leakage.

The rear end of the casing, which is rectangular, is provided with a removable plate 8, fitted in a recess of the rear end of the chamber or casing and secured to the same by screws 9 or other suitable fastening devices, a washer $8^a$ of rubber or leather being interposed between the removable plate 8 and the inner wall of the recess to provide a water-tight joint. The outer face of the removable plate is flush with the adjacent outer face of the casing, and the said plate is provided with a tubular extension forming a valve-casing. The tubular extension 10, which is provided on its interior with a valve-seat 11, receives a valve 12, preferably constructed of elastic material and connected by a stem 13 with one arm of a bell-crank lever 14, which extends into the casing 3 and carries a float 15, provided with a removable cap $15^a$ and adapted to be operated by water rising within the casing 3. The lever 14, which consists of a long arm and a short arm, is fulcrumed at its angle on the removable plate, which is provided at its inner face with projecting perforated ears 16 to receive the pivot of the lever. The float 15 is constructed of any suitable sheet metal or analogous material which will not rust. The flexible valve 12, which is mounted on the stem 13, is held in place by means of a washer 17 and a nut 18, which engages the threaded outer or rear end of the stem. The tubular arm or valve-casing is exteriorly threaded at 19 and receives a tubular or cylindrical cap 20, having a perforated outer end 21, forming a strainer.

The device is designed to be connected with any suitable source of supply, which may consist of a reservoir, tank, barrel, or the like, and as the water flowing through the valve-casing rises within the drinking-receptacle and the float-casing 3 the float will be raised until the valve closes on the seat, when the supply will be shut off. As soon as the water is consumed to a sufficient extent to permit the float to descend the valve will be moved backward by the float and opened to start the water again. By this construction the valve is purely automatic, being controlled in opening and closing by the movement of the float.

The invention has the following advantages: The watering-trough is simple and comparatively inexpensive in construction, it is strong and durable and adapted to be applied to a barrel, tank, or other suitable source of supply, and it is purely automatic in its operation. The parts may be readily assembled and separated and ready access to the valve mechanism is afforded.

Changes in the form, proportion, size, and the minor details of construction within the scope of the appended claim may be resorted to without departing from the spirit or sacrificing any of the advantages of this invention.

What is claimed is—

A device of the class described, comprising a drinking-receptacle having two lobes to form a double drinking-trough, a chamber or casing, upper and lower short lengths of pipes connecting the central portion of the rear of the said receptacle to the front end of the casing, a plate detachably secured to the rear end of the said chamber or casing and having an outwardly-extending horizontally-disposed tubular arm arranged at the center thereof and having a rear valve-seat, a cap removably mounted on the arm over the valve-seat and having a strainer-covering at its rear end, a valve movably mounted in the seat and having a stem projecting through the arm and adapted to be shifted longitudinally, and a bell-crank lever fulcrumed to the inner side of the plate above the plane of the opening through the arm communicating with the chamber or casing and having a distinctly-short arm connected to the front end of the valve-stem and provided on its long arm with a float.

In testimony that I claim the foregoing as my own I have hereto affixed my signature in the presence of two witnesses.

GEORGE H. MOTT.

Witnesses:
ALFRED G. WEBSTER,
WILLIAM A. MOTT.